Oct. 10, 1961  F. HOTCHNER  3,003,378
PREDETERMINED TORQUE RELEASE WRENCH
PROVIDED WITH MEANS TO LOCK A BOLT
AND NUT IN ASSEMBLED RELATION
Filed Feb. 24, 1959  2 Sheets-Sheet 1
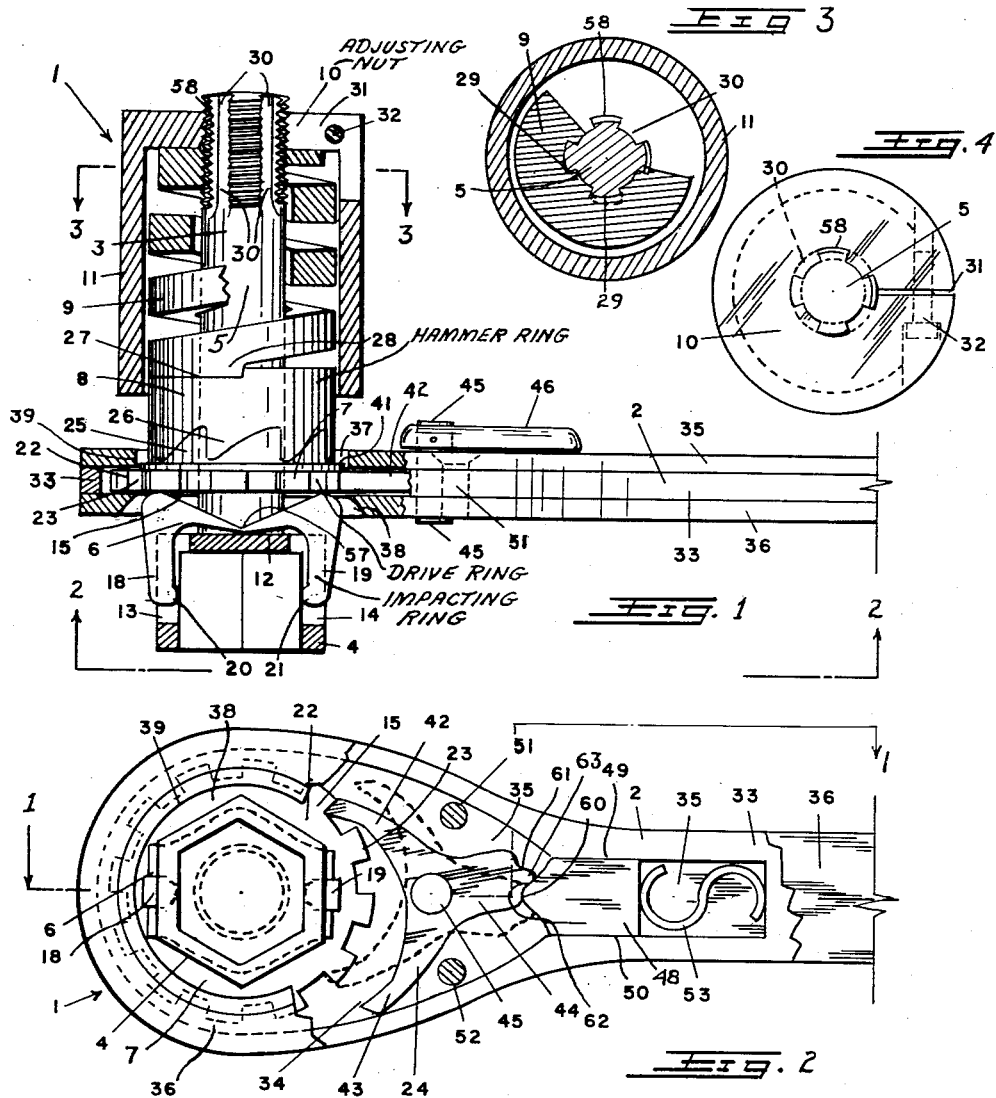
INVENTOR.
Fred Hotchner Oct. 10, 1961

F. HOTCHNER 3,003,378

PREDETERMINED TORQUE RELEASE WRENCH
PROVIDED WITH MEANS TO LOCK A BOLT
AND NUT IN ASSEMBLED RELATION

Filed Feb. 24, 1959

INVENTOR.
Fred Hotchner

United States Patent Office 3,003,378
Patented Oct. 10, 1961

3,003,378
PREDETERMINED TORQUE RELEASE WRENCH PROVIDED WITH MEANS TO LOCK A BOLT AND NUT IN ASSEMBLED RELATION
Fred Hotchner, San Pedro, Calif.
(P.O. Box 738, Chicago 90, Ill.)
Filed Feb. 24, 1959, Ser. No. 794,981
8 Claims. (Cl. 81—52.4)

In the manufacture of machines and structures employing bolted connections it is generally deemed desirable to make use of self-locking nuts, or to use free running nuts and provide means to lock the nuts after they have been fully set up in the assemblage. The use of self-locking nuts in high-performance equipment is seriously limited by the fact that such nuts present resistance to turn-up torque due to their grip on the bolt threads which masks the resistance attributable to the stressing of the bolt shank. Therefore, the action of the torque control wrench is not truly responsive to bolt shank reaction, but includes nut drag reaction, and falls far short of stressing a line of bolts to acceptably uniform shank tension values.

My invention provides a torque limit wrench which may be used to drive a free running nut into final seated position in a bolted assemblage under conditions such that the resistance to which the wrench is responsive in its limit operation is closely related to the tension being imposed on the bolt shank, and to effect a distortion lock between the nut and bolt, or nut and work piece after the nut has been seated.

The nut is thereby turned up to final positioning under ideal conditions free from tendency to thread surface galling and high stress localization characteristic of the behavior of lock nuts of the prevailing torque, self-locking and distortion lock types, the connection being completed at the termination of the turn-up phase, all in the single continuous operation, leaving the nut locked in the assemblage.

Locking of the nut to the bolt, or to the work piece, is effected by the delivery of a distorting blow to the appropriate part with the members in their final seated and fully stressed condition whereby the locking parts are driven into firm frictional engagement with, or indented one into the other.

The invention further provides means to discriminate between the desired tensile stress in the bolt shank and the undesired torsional stress in the bolt shank residual from the turn-up of the nut without detracting from the effectiveness of the connection. This may be optionally effected as the last phase of the operation of the device by turning the nut backward a slight amount after the locking phase has been effected. In a preferred mode of operation of the device, as described below, this may be done in such manner that the parts which are locked together by the distorting blow are the more firmly engaged by the same back turn action employed to relieve torsional stress in the bolt shank.

It is an object of the invention to provide a wrench of the character below described which may handily be manipulated by mechanics of ordinary competance, without the requirement of any special skill, in the performance of work of high, uniform and dependable quality.

It is an object of the invention to provide a wrench of the character described by means of which a free running nut may be turned up to final position on a bolt in a mechanical assemblage to a predetermined maximum torque value and automatically locked into the assemblage by the delivery of a distorting blow to one of the members thereof to drive it into locking engagement with a mating member.

It is an object of the invention to provide a wrench of the character described which will store up energy during the turn-up period of operation, to be automatically released and employed in the instantaneous delivery of the distorting blow as soon as the predetermined torque limit has been reached.

It is a further object of the invention to provide a wrench of the character described which will release the turning moment on the nut just before the locking blow has been delivered, to improve the quality of work performed by virtue of a physical effect described below.

A still further object of the invention is to provide a wrench of the character described which will be adapted to turning the nut backward immediately after it has been set and locked without the necessity of lifting it from the work.

The invention may be embodied in the form of a wrench for either manual or power drive, and either as a tool designed specifically and exclusively for the purposes herein specified, or as an attachment to or accessory for any manual or power tool of conventional form.

The wrench of this invention may be variously constructed according to its various species to lock the nut to the bolt or the bolt to the nut by a blow suitably applied to either, or it may be constructed to lock the nut to the proximate surface of a work piece through which the mating bolt extends, or the work piece to the nut by a blow applied to either.

The invention is illustrated in its broad aspect as embodied in a wrench adapted to lock the nut to the bolt by delivering a distorting blow to opposing sides of the nut, as a preferred embodiment which contemplates modification to any of the embodiments illustrated by the generalized figures in the drawings, which are set forth in the following specification as various species of the invention. It is to be understood that the device of this invention may be variously otherwise embodied within the purview of the claims beyond any limitations as to the particular details of the device of the drawings.

Additional objects of the invention will be apparent from the specification below.

In the specification which follows and in the claims, the portion of the machine or structure through which the bolt extends to receive the nut as described herein is designated as the "work piece."

The wrench of the invention is shown in a preferred embodiment in the accompanying drawings, in which FIGURE 1 is a side elevation partially in section of a torque limit and locking wrench adapted for manual operation, taken as indicated by reference line 1—1 in FIGURE 2.

FIGURE 2 is a bottom view of the wrench taken as indicated by reference line 2—2 in FIGURE 1, fragmentation of the bottom plate exposing the ratcheting mechanism.

FIGURE 3 is a horizontal cross section through the impacting unit taken as indicated by section line 3—3 in FIGURE 1.

FIGURE 4 is a top view of the wrenching and locking unit.

FIGURES 10, 11 and 12 are axial cross sections through the assemblage of nut, bolt and a portion of a work piece, showing various modes of distortion effected by the tool of this invention in its various modifications to lock one member of the assemblage to another.

Figure 8:
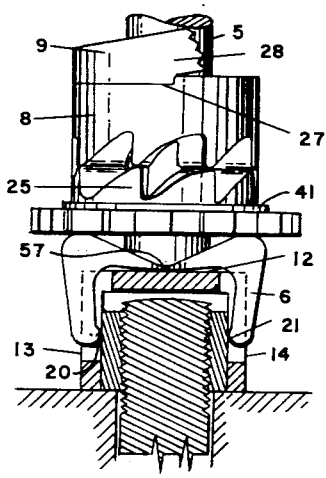
FIGURES 8 and 9 are elevations partially in section of the assemblage of nut, bolt, on a work piece with the wrench socket in working position, showing two stages in the operation of the impacting ring, drive ring and hammer ring in locking the nut to the bolt.

In the practice of this invention, a free running nut, manufactured to as close tolerance as desired, and undistorted for any requirement of finally locking the nut to the bolt, is turned up by means of a torque-limit wrench constructed hereaccording, on the end of a bolt extending through a surface of a work piece, to a predetermined value of applied torque corresponding closely to the tension desirably imposed on the shank of the bolt, at which point, with the parts firmly seated to each other and stressed as uniformly as attainable with properly matched parts, a distorting blow is delivered to one part to lock it to another part of the assemblage. In a preferred practice, the turning moment on the nut is released the instant before the blow is delivered to insure the more solid locking of the parts. In a final optional step, the nut is turned back on the bolt to relieve torsional stress in the bolt, in accordance with the theory set forth below. Certain other benefits are understood to be gained by thus over-stressing an assemblage momentarily and finally reducing the stresses to the working values. The practice provides that this final step may be taken without lowering, or even by inhancing the intensity of the lock.

In the design of machines and structures to function under extreme service conditions, the size and number of bolted joints may be decreased, or the factor of safety lowered, or the loading increased, if it be certain that the bolts will be firmly seated during manufacture and set up to closely controlled initial stressing, and furthermore be stressed to a high degree of uniformity across the shank section, free from abnormal stressing in the critical regions between the bolt shank and head and the first thread meeting of bolt and nut.

In the most advanced practice, taking advantage of the latest technology, materials and equipment, bolts are stressed to or beyond the yield point to work the metal to its best advantage. This practice is permissible only under conditions which insure that the ultimate stressing is held within close limits, free from any danger of approach to ultimate strength values. This invention is consistent with this extreme practice in the completion of joints with the distortion locking feature.

The prior art use of lock nuts which have thread distortion set up during manufacture, or which become distorted as they are set up in use due to mismatching between the nut base and work piece surface, is marked by conditions highly detrimental to the above-noted results.

Mismatching of thread surfaces, or mismatching of nut base and work piece surfaces, tends to non-uniformity of stress distribution over the bolt section and possible high local concentration of stress. Localization of pressure between mating thread surfaces, and between nut base and work piece surfaces, greatly increases the incidence of galling, as a consequence of which particles of metal are torn from mating surfaces and dragged along between mating surfaces, increasing the damage, rendering firm seating impossible, and torque values indeterminate.

The resistance to applied torque which is attributable to the tension being set up in the bolt shank is masked by the resistance attributable to the grip of nut on bolt consequent to the distortion lock, and sometimes rendered completely meaningless by the erratic resistance of galled particles between the mating surfaces. Hence it is difficult, very uncertain, or in some cases impossible, to set up nuts of such distortion lock type to such degree as to pull the bolts up to shank tension values within reasonable bounds by means of torque-limit wrenches, or in accordance with the indication of torque-indicator wrenches.

In the practice of my invention, nuts and bolts manufactured to the closest tolerance may be used and set up by torque-limiting or torque-indicating wrenches under conditions such that the wrench action or wrench indication is in close correspondence to the bolt shank tension, thus justifying the use of the most extreme high strength construction, unlimited by the locking feature which is not set up in the assemblage until the parts are fully seated and stressed.

In the operation of impacting the part to be distorted against or into another, such as the nut being locked to the bolt, the blow is delivered against a part which is virtually one with the rest of the assemblage so far as dynamic states are concerned. A condition is here existent closely analogous to the conditions present at the active region of a metal part being fabricated by stretch forming. In that process, the movement of metal occurs mainly at the point where the part being fabricated is about to or has come to rest against the die, the metal coming to rest in a region which has assumed its final shape. It is characteristic of that process that the part is subject to very little or virtually zero spring back.

With the parts locked up tight in their final relationship, the force of the locking blow is received by the impacted region of one part which is thus and driven against the mating part in the fashion of an object being formed on an anvil. If the nut be impacted, the threaded region underlying the region of impact is driven down against and closes up any remaining spaces between the mating faces of the threads, thus closing the contact between nut and bolt threads to a solid mass, with broad frictional facing under intense pressure.

If sufficient force be provided behind the blow, the nut will be driven into an indentation in the bolt, with metal displacement from the bolt, to offset the indentation, taking place backward in the direction of the nut over a region surrounding the region of the indentation. Thus, in addition to the frictional grip developed by driving the opposing thread surfaces into tight engagement, an interlocking of the parts is set up by driving a portion of one part into the other, with metal displacemnt across the interfaces of the thread helices.

After the nut and bolt have been thus locked together, if the nut now be turned back on the bolt, a distorted region of the threads of the one is traversed into engagement with an undistorted region of the threads of the other, thus tightening the grip instead of releasing it. Further, if the blow has been delivered in such fashion, and to such intensity, that a reverse flow of metal takes place across the interfaces of the thread helices to a substantial degree, then a distorted region of the threads of each part is traversed into engagement with an undistorted region of the threads of the other, with additional improvement in the grip in the case of turn-back. The importance of this aspect of the invention will be appreciated in view of the desirability of relieving the torsion in the bolt which is to be stressed in tension to the region of "yield," as explained below.

It is desirable to relieve the torque loading on the nut just before the distorting blow is delivered. The reason for this is, that when maximum predetermined torque loading has been reached, movement of the nut should cease, or will cease due to the action of the wrench or due to the manner in which the mechanic handles the wrench. If now the torque be maintained when the blow lands, the shock may cause the wrench to set the nut up tighter, and to an undetermined degree to over-tighten the nut. Furthermore, this movement will be taking place during the period when the metal is being moved to set up the locking grip and may lower the quality of the work.

In the preferred practice of the invention, the drive-up torque is released just before the blow is delivered. The metal movement under the point of impact is responsive to the energy of the blow and the stabilizing strains holding the parts in their true engagement, both together directing the metal in a direction such as to leave the setting of the nut to the work piece unimpaired. The possible disturbance to the uniformity of stress across the bolt shank is reduced to an insignificant value.

While the bolt is stressed in torsion, any tendency to back movement of the nut is resisted by the frictional engagement of nut and work piece surface, and such movement as might take place must be in the direction of the possible release under vibration in service and hence will induce the metal being displaced to its own cancellation. This reaction, obviously, falls rapidly as the energy stored in twisting of the bolt is released, so that in any case it is an insignificant factor so far as disturbance to grip is concerned. Hence, firmness in the locking effect is promoted by releasing the driving torque before the locking blow is delivered.

In the general practice of the art in setting up bolts to or slightly beyond yield, the effect of residual torsional stress in the bolt may be very significant in the ultimate strength of the connection. As mentioned above, the fact that torsional stress is inherently non-uniform across the bolt shank tension, thus establishing a localized maximum of combined stress, and the fact that this combined stress is most critical to the regions of bolt shank and bolt head juncture and bolt thread and nut thread juncture, argue for careful relief of this stress when it may be accomplished under close control and under practical field conditions.

With close control over the state of the joint after the bolt has been over-set and locked which is afforded by this practice, relief of the residual torsion in the bolt is reduced to a matter of turn-back to a certain angular displacement which, once determined by test, may be repeated in practice in anticipation of consistent results.

In the practice of this invention in locking nuts to bolts, although the locking may be effected by applying the blow to one side of the nut, it is preferred that the nut be locked to the bolt by a blow applied to each of a pair of opposing sides as is shown in the illustration of the apparatus of the drawings. The end served of course, is to minimize lateral force against the bolt. It is also permissible, to set up nuts having six sides, to apply the locking blow to three alternate sides, The term "opposite sides" as used in the claims to indicate the manner of application of the blow to multiple points of the nut is to be understood as referring to any distribution of the blow to multiple sides which effects a reduction of lateral force on the bolt.

The wrench of this invention is shown in a preferred embodiment in the drawings, in which the wrenching and impacting functions are performed by the wrenching and impacting unit indicated generally by numeral 1, and driven by the manually operated handle 2. A powered drive unit may be substituted if desired.

The unit 1 is composed of the arbor 3, which arbor includes integrally, the socket 4 and the shank 5, on which shank are positioned in order, the impacting ring 6, the drive ring 7, the hammer ring 8, the helical spring 9, and the adjusting nut 10, which later is formed integral with the protective and weighting shield 11.

The socket 4, which is formed to fit over an hexagonal nut in this case, may of course be made to fit any type of nut. Being wider than the shank, it presents the shoulder 12 for reception of the impacting ring 6, and is slotted down opposite faces at 13 and 14 from this shoulder. The slots open to the interior of the socket to expose areas of opposite faces of the nut and terminate backward of the socket mouth to leave a solid rim structure to maintain firm grip on the nut and prevent spreading of the socket opening.

The impacting ring 6, positioned between the shoulder 12 of the socket and the under surface 15 of the drive ring 7, takes the general form of a pair of thick bodied, tapered arm yokes 54 and 55 meeting at opposite sides of the shank at 56 and 57. It presents a general saddle-shaped arrangement in which the bottom of the saddle bears on the shoulder 12 of the socket and the upper surfaces or edges of the thick yoke bodies meet the under surface 15 of the drive ring, with the under surfaces or edges of the yoke bodies normally spaced from the shoulder 12.

Depending from the yoke bodies at 16 and 17, and fitting into the slots at 13 and 14 are the arms 18 and 19, each terminating in a protuberance formed to dent the proximate nut face under a sharp impact. The yokes and the arms 18 and 19 are formed integral, of spring temper steel, in the normal relaxed shape as shown in the drawings with the protuberances 20 and 21 just bearing lightly on the nut faces.

Figure 9:
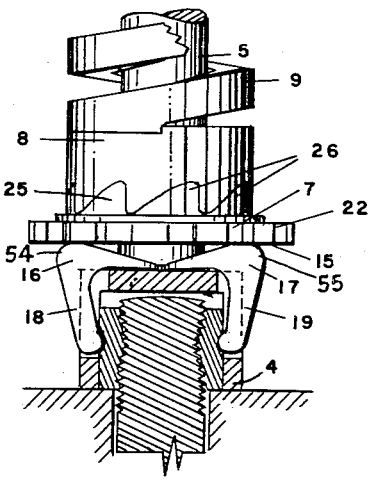
Figures 5, 6:
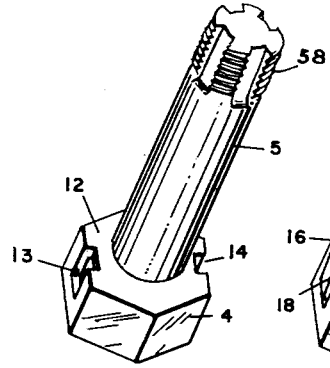
FIGURE 5 is a perspective view of the arbor.
FIGURE 6 is a perspective view of the arbor with the impacting ring in position.
Figure 7:
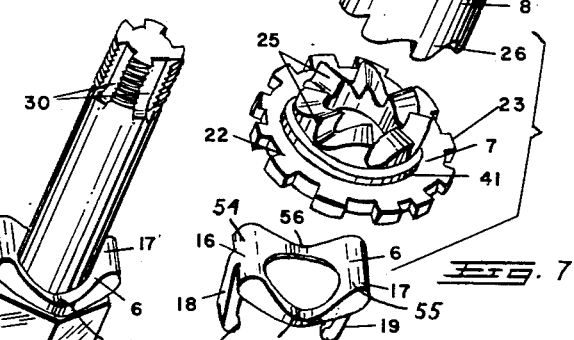
FIGURE 7 is a perspective view of the impacting ring, the drive ring and the hammer ring displaced axially from their relative normal positions.

Under a sharp blow delivered to the impacting ring 6 through the drive ring 7 by the hammer ring 8, the saddle-like shape is distorted toward the flat, and the arms 18 and 19 are swung down to drive the protuberances 20 and 21 into the nut faces. The principle of this action is illustrated in FIGURES 8 and 9, the amount of the movement and the degree of distortion of the parts being greatly exaggerated for the sake of illustration. Actually the amount of movement may be very slight, and in the case of nuts and bolts manufactured to close tolerances, the material displacement to effect a tight lock may be very little.

The drive ring 7 takes the form of a disk 22 presenting the two way ratchet teeth 23, 23, etc., to the pawl 24 of the ratcheting mechanism in the handle 2. It presents a set of helical surfaced teeth 25, 25, etc., in cylindrical arrangement, with the circumference thereof less in diameter than the root circle of the ratchet teeth, extending upward to engage a complementary set of helical teeth 26, 26, etc., extending downward from the hammer ring 8.

The hammer ring, the mass of which is selected in each design to deliver a blow of the magnitude requisite for the work to be performed under the drive of the spring 9, takes a cylindrical shape with the upper surface detented at 27 to receive the lower end 28 of the spring 9 in heel and toe engagement such that the two are restrained against rotary displacement relative to each other.

The inner diameter of the convolutions of the spring is greater than the diameter of the shank of the arbor with the exception of the uppermost turn which is contracted to provide for the cutting of the spline slots 29, 29, etc., which engage the complementary spline between the slots 30, 30, etc., cut into the upper end of the arbor shank. While the spline slots intersect the fine pitch threads 58 on the end of the shank, they permit the application of the adjusting nut 10 which serves to regulate the initial compression of the spring which determines the torque required to compress the spring to the release point.

The shield 11, integral with the nut 10, provides dust and dirt protection for the moving parts and prevents personal contact therewith. The shield may be made as thick as desired to present massiveness against the back thrust of the spring during the imposition of the blow.

The adjusting nut is provided with a radial split at 31, from the center hole to the rim, which split extends down the shield a sufficient distance to permit the nut being tightened up on the shank by means of the pull-up screw 32, whereby to regulate the resistance to turn of the shield in adjusting the spring force.

The handle 2 comprises the handle frame 33, having the enlarged opening at 34 which forms a chamber for the ratchet mechanism, with the top and bottom plates 35 and 36, all being secured together by screws such as shown at 51 and 52. The wrenching unit 1 extends through the openings 37 and 38 in the plates, with the socket end presented to the work below the handle and the shielded end extending upward within reach of the operator. The disk portion 22 of the drive ring is thus caught between the plates 35 and 36 with the teeth 23 presented to the pawl 24 within the chamber of the handle.

The wrenching unit 1, extending through the openings in the handle plates, is guided in proper spacing to the pawl by the edge 39 of the opening 37 in the top plate presented to the edge of the shoulder 41 of the drive disk 22. The wrenching unit is thus adaptable as a whole into any suitable type of driving mechanism. Being automatic in the limitation which it imposes on the maximum turning moment which may be imposed on the nut and in the delivery of the locking blow, it is particularly well adapted to power drive where rapid assembly operations are demanded, or where the physical effort imposed on mechanics by hand driven tools is objectionable.

The pawl 24, positioned between the plates 35 and 36, presents its arms 42 and 43 to the teeth 23 of the disk 22, and the latching arm 44 to the locking block 48, swiveling on its pivot 45 between its two alternate positions of engagement with the ratchet teeth. The latching arm 44, terminating in the rounded boss 63, works against the boss 60 of the block 48 as the pawl is snapped between its two extreme positions by means of the lever 46 pinned to the upper end of the pivot 45 within reach of the operator. The block 48 slides between the ways 49 and 50 presented by the inturned edges of the opening 34 in the handle frame and the inturned surfaces of the plates 35 and 36, being urged by the S spring 53 against the arm 44. With the ratchet in either operating position, the boss 60 of the block bears against one of the sides 61 and 62 of the boss 63 of the latching arm, thus providing spring reaction for the active pawl arm against the ratchet teeth.

The pawl is shown in solid lines in FIGURE 2 in position to drive the socket to turn up a right hand threaded nut, and in broken lines in the turn-off position.

In the use of the wrench, the nut may be spun up by hand grip of the shield 11 until resistance is met, after which the nut is ratcheted to its set-up position by means of the handle. During this period, under the initial compression of the spring due to the setting of the adjusting nut, the teeth 25 of the drive ring remain in full seating with the teeth 26 of the hammer ring, driving the nut through the turning of hammer ring, spring and arbor together.

When the resistance to further turning overcomes the force holding the teeth together, the application of additional driving torque turns the drive ring, driving the hammer ring upward and increasing the compression of the spring, as shown in FIGURE 8. Rotation of the driving ring beyond the point at which the two sets of teeth are in crest contact releases the hammer to drive it down against the drive ring in a sharp blow which is transmitted to the impacting ring.

It is desirable that the spring be designed to have a very low ratio of rotary deflection to longitudinal deflection under the sliding drive of the engagement of the teeth. The hammer ring and spring may, of course, be manufactured as a single piece, and the spring may take any suitable configuration to provide the most desirable action. The matching surfaces of the teeth of the drive and hammer rings should be accurately configurated, smooth and even preferably treated with one of the anti-friction coatings now in extensive use in the mechanical arts. Coatings carrying molybdenum disulfide are extensively used in services where comparable surface actions are experienced. The purpose of such coating would be to reduce or eliminate the slip-stick effect and provide smoother action. The configuration of the matching teeth is also subject to modifications, to provide operational behavior and reaction discernable to the feel of the operator as service conditions dictate.

The impacting ring is preferably manufactured from high temper spring steel of characteristics such that it flexes at the regions 56 and 57 under the blow delivered to it through the drive ring, allowing the two yoke shaped halves to hinge on each other as it is flattened out and swing the arms 18 and 19 to drive the proturberant points 20 and 21 into the sides of the engaged nut. This action is shown to a very much exaggerated degree in FIGURE 9, in which it is seen that the region of the nut threads under the point of impact may be driven into the complementary region of the bolt, thereby providing a physical interlock between the two.

In practice, the distortion necessary to lock a nut and bolt together, when the same have been manufactured to close tolerances, may be very slight.

It is known that the torque values to which nuts should be set up to develop maximum strength in the bolts and to avoid overstressing varies over wide ranges with parts of different material, to be assembled under different conditions, by means of equipment intended for operation under different temperature conditions. The same may be said for the manner in which the parts should be locked to each other so far as the intensity of the distorting blow is concerned, and the area of the part over which the blow is to be applied.

Therefore it is desirable in the commercial application of this invention to provide a variety of springs and a variety of impacting rings, from which selection may be made by test to determine the best combination for any particular production run. It is noted that the design of the wrench is such that interchanging of these parts may be made conveniently and rapidly as necessity dictates.

By the use of wrenches made as here disclosed, with suitable modifications for such purposes, the locking of assemblages of nut, bolt and work piece may be effected, by means of a distorting blow applied to either nut or bolt to lock one to the other, or by a distorting blow applied to either the work piece or the nut to lock one to the other. As shown in FIGURE 10, at A, the bolt may be distorted to lock it to the nut by a distorting blow delivered to the end of the bolt near the rim. Such a distortion may be set up at a single or two or more points.

The bolt may be locked to the nut by delivering an intense blow at the end in the center, as indicated at FIGURE 11, B, to expand the end of the bolt in all directions toward the threads. The distorting blow may be delivered at one or more points along the juncture of the threads of nut and bolt as shown at C in FIGURE 10, or at one or more points on the end of the nut as shown at D in FIGURE 11. In FIGURE 12 is shown the method of delivering a blow to a point of the work piece near the rim of the nut as at E, or to a point of the nut near the surface of the work piece as at F.

In the claims, expressions indicating that the blow is delivered in such manner as to lock one member to the other are used in the broad sense of indicating that when the blow is delivered at a juncture of two members, as at C in FIGURE 10, each member is, within the contemplation of that expression, being simultaneously locked to the other.

Figure 13:
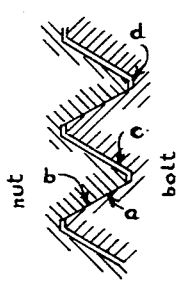
FIGURE 13 is a longitudinal cross section across mating threads of a nut and a bolt illustrating the normal relationship of thread facings when the nut has been set up to its final seating.

Relative positioning of the thread surfaces of nut and bolt, fully set up in an assemblage, is shown on enlarged scale in FIGURE 13, the upper threads sides *a* of the bolt being in full facing association with the lower thread sides of the nut *b* with the opposite faces of nut and bolt being separated by the amount of tolerance permitted in manufacture as indicated at *c*, with the crest-root separation indicated at *d*.

Figure 14:
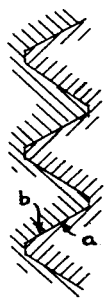
FIGURE 14 is illustrative of distortion imposed on the nut threads to provide frictional grip with the bolt threads.

The effect of impacting nut and bolt threads together by delivering a blow according to my method which is just sufficient to close up the thread spacings without deformation into the bolt thread or body is shown in FIGURE 14. It is noted here that, under the condition of tight fit and initial stressing present, this compacting is taking place with negligible spring-back and hence a firm frictional lock may be had unique to this method and entirely beyond any which may be developed by pre-deformed nuts. As this engagement is gall-free, the nut may be turned back to relieve torsion in the bolt without damage to the grip.

Figure 15:
FIGURE 15 is a cross section similar to that of FIGURE 13 in which the distortion has been delivered by a blow of such intensity as to cause penetration of a portion of the nut into the bolt, illustrating the effect of displacement of material of the bolt backward toward the nut around the region of penetration.

FIGURE 15 is illustrative in a general fashion of the effect of intensifying the deformation blow to drive a portion of the nut into the body of the bolt, the original position of the pitch line being shown by the broken line. It is here seen that the material of the nut under the region of impact at *e* is driven into the bolt tending to cause a back flow of material across the pitch line through the surrounding region after first compacting the thread engagement at the expense of the tolerance. The same condition is shown in the section taken along the direction of the threads in FIGURE 16. The regions of back-thrust of the metal are indicated by *f*.

It is to be understood that the mode of deformation to be looked for in practice may not necessarily follow the pattern of these views, but is subject to considerable variation according to the manner in which the distorting blow is delivered and other physical conditions present in any specific case.

Figure 16:
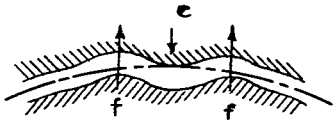
FIGURE 16 is a cross section, transverse of the bolt axis, of the region of distortion to which a blow of intensity such as to produce the effect of FIGURE 15 has been delivered.

After a nut has been locked to the bolt in the manner illustrated in FIGURES 15 and 16, the condition set up by turning the nut backward to relieve bolt shank torsion results from a distorted region of the threads of one being forced into engagement with an undistorted region of the threads of the other. That is to say: The threads of the nut which, in the region indicated by *f*, have been forced to invade a region within the normal periphery of the bolt, are moved into engagement with undistorted threads of the bolt, thus setting up an intensified compression between the two. When the distorting blow has been so delivered as to cause some of the material of the bolt to invade a region normally within the bounds of the nut, the same may be said in this connection as well.

It is here noted that, while it is inherent in the action here described in moving the metal during deformation, due to the firm seating of the parts to each other at the instant of the impact, that the spring-back effect is insignificant, the action above described insures that no such effect can persist after the nut has been turned backward.

Having thus described my invention, what I claim is:

1. A predetermined torque release wrench including socket means adapted to engage a nut positioned on a bolt and apply turning moment thereto, impacting means associated with said socket means and adapted to deliver a distorting blow to the nut to lock it to the bolt on which it is positioned, and drive means adapted to apply turning moment to the nut through said socket means to turn it up on the bolt until the value of the applied torque reaches a predetermined maximum and to thereafter impart energy to said impacting means to lock the nut to the bolt.

2. A predetermined torque release wrench including socket means adapted to engage a nut positioned on a bolt and apply turning moment thereto, impacting means associated with said socket means and adapted to deliver a distorting blow to the nut to lock it to the bolt on which it is positioned, and drive means adapted to apply turning moment to the nut through said socket means to turn it up on the bolt until the value of the applied torque reaches a predetermined maximum and to thereafter release the turning moment thus applied to the nut and impart energy to said impacting means when the nut is free from turning moment to lock the nut to the bolt.

3. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to one of the members of such assemblage of nut, bolt and work piece to lock it to another one of the members of said assemblage, and drive means adapted to apply turning moment to the nut through said socket means to turn it up on the bolt until the value of the applied torque reaches a predetermined maximum and to thereafter impart energy to said impacting means to thereby lock one of the members of said assemblage to another.

4. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to one of the members of such assemblage of nut, bolt and work piece to lock it to another one of the members of said assemblage, and drive means adapted to apply turning moment to the nut through said socket means to turn it up on the bolt until the value of the applied torque reaches a predetermined maximum and thereafter release the turning moment thus applied to the nut and impart energy to said impacting means to thereby lock one of the members of said assemblage to another.

5. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to the nut to lock it to the bolt on which it is positioned, drive means whereby to apply turning moment to the wrench, and energy storage means adapted to receive energy from said drive means, to store energy, and to deliver energy to said socket means as turning moment until the value of applied torque reaches a predetermined maximum and to thereafter release the stored energy as a blow to said impacting means whereby to lock said nut to said bolt.

6. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to the nut to lock it to the bolt on which it is positioned, drive means whereby to apply turning moment to the wrench, and energy storage means adapted to receive energy from said drive means, to store energy, and to deliver energy to said socket means as turning moment until the value of applied torque reaches a predetermined maximum and to thereafter release the driving force on said socket means and deliver the stored energy as a blow to said impacting when the nut is free from turning moment means whereby to lock said nut to said bolt.

7. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to one of the members of such assemblage of nut, bolt and work piece to lock it to another one of the members of said assemblage, drive means whereby to apply turning moment to the wrench, and energy storage means adapted to receive energy from said drive means, to store energy, and to deliver energy to said socket means as turning moment until the value of applied torque reaches a predetermined maximum and to thereafter release the stored energy as a blow to said impacting means whereby to lock the said one member of said assemblage to said other member.

8. A predetermined torque release wrench including socket means adapted to engage a nut positioned on a bolt which extends through a surface of a work piece and apply turning moment to the nut to tighten it up against said surface and place the bolt under initial tension, impacting means associated with said socket means and adapted to deliver a distorting blow to one of the members of such assemblage of nut, bolt and work piece to lock it to another one of the members of said assemblage, drive means whereby to apply turning moment to the wrench, and energy storage means adapted to receive energy from said drive means, to store energy, and to deliver energy to said socket means as turning moment until the value of applied torque reaches a predetermined maximum and to thereafter release the driving force on said socket means and deliver the stored energy as a blow to said impacting means whereby to lock the said one member of said assemblage to said other member.

References Cited in the file of this patent

UNITED STATES PATENTS

| | | |
|---|---|---|
| 1,163,784 | Skinner | Dec. 14, 1915 |
| 1,289,422 | Farnes | Dec. 31, 1918 |
| 1,406,065 | Norwood | Feb. 7, 1922 |
| 1,815,517 | Long | July 21, 1931 |
| 2,427,153 | Mossberg | Sept. 9, 1947 |
| 2,538,343 | Van Winkle | Jan. 16, 1951 |
| 2,544,522 | Bertelsen | Mar. 6, 1951 |
| 2,631,485 | Stuart et al. | Mar. 17, 1953 |
| 2,688,890 | Williams | Sept. 14, 1954 |
| 2,734,412 | Orner | Feb. 14, 1956 |
| 2,736,219 | May | Feb. 28, 1956 |
| 2,756,622 | La Belle | July 31, 1956 |
| 2,760,393 | Stough | Aug. 28, 1956 |
| 2,820,382 | Smith | Jan. 21, 1958 |
| 2,866,370 | Biach | Dec. 30, 1958 |
| 2,889,729 | Orner | June 9, 1959 |